Feb. 6, 1934.     H. S. NEWCOMER     1,945,950
ANAMORPHOSING OBJECTIVE
Filed March 2, 1929
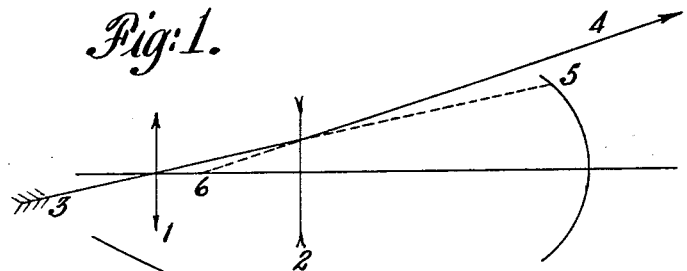
*Fig. 1.*
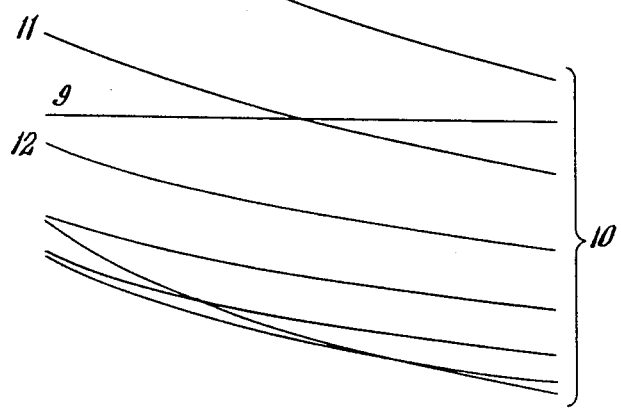
*Fig. 2.*
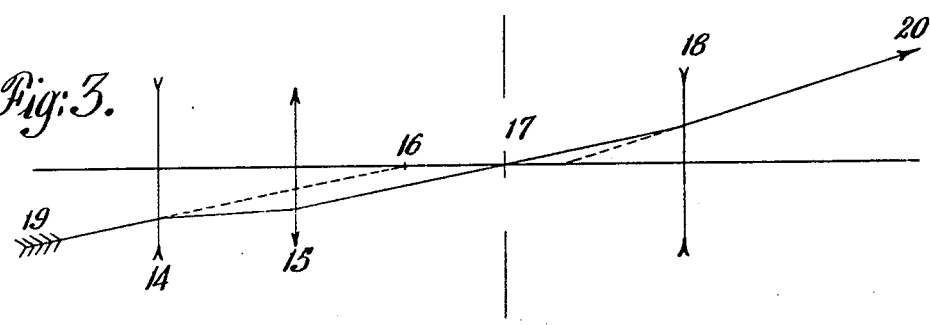
*Fig. 3.*
*Fig. 4.*
INVENTOR
HARRY SIDNEY NEWCOMER
BY
*Maurice B. Landis*
ATTORNEY Patented Feb. 6, 1934

1,945,950

UNITED STATES PATENT OFFICE 1,945,950

ANAMORPHOSING OBJECTIVE

Harry Sidney Newcomer, New York, N. Y.

Application March 2, 1929. Serial No. 344,034

1 Claim. (Cl. 88—57)

This invention relates to photographic objectives and more particularly to improvements in afocal anamorphosing cylindrical objectives. The invention has been developed in connection with the design of apparatus for use in taking and projecting motion pictures when it is desired to increase the field as projected on the screen while, nevertheless, using films of standard proportions, and for convenience such an embodiment of the invention will be described for the purposes of illustration.

An afocal cylindrical anamorphosing or compression objective of this character is used in front of the ordinary photographic (or projection) objective and forms a unidimensionally compressed image of the object in the plane of the object, this image being conjugate to the image on the moving picture film formed by the ordinary objective.

An anamorphosing objective of this character consists in its simplest form of a single positive lens and a single negative lens, with their axes in the same plane and so spaced that the second focal point of the positive lens coincides with the first focal point of the negative lens. The afocal objective can be considered as a null convergence objective for when focussed on an object nearer than infinity it does not change the convergence of pencils of rays passing through it. To this end the distance between the two members is subject to variation so that the relationship between object and image given in the first sentence of this paragraph may hold when the object is not at infinity. Such an objective, the forms of the lenses being chosen at random, has chromatic and geometrical aberrations which wholly destroy the definition of the resultant image. One of the simplest improvements in such an objective is to achromatize each member separately, for instance, by forming each member of two lenses of appropriate refracting powers and of glasses of appropriate constringences. There then remains the necessity of correcting the geometrical aberrations.

The nature and objects of the invention will be better understood from a description of an embodiment thereof, for the purposes of which description reference should be had to the accompanying drawing forming a part hereof and in which—

Figure 1 is a diagrammatic representation of an arrangement of lenses embodying the invention, Figure 2 is a plot showing the relation between certain factors, Figure 3 is a diagrammatic representation showing an arrangement in which three elements are used, and Figure 4 is a sectional view of an afocal compression objective having a magnification constant of two-thirds and for which the aberrations have been corrected.

If the direction of propagation of light be taken as positive and parallel light be considered as incident on a lens then it is brought to a focus at the second focal point of the lens and the other focal point is called the first focal point. Throughout this specification the nomenclature referring to first and second focal points of either member of the objective is understood as referring to focal points defined when the direction of propagation of light is as if it were incident on the exterior surface of the positive member of the objective. In order to simplify the terminology defining the distance relationships between the members of the objective, when the objective is focused on an object nearer than infinity the second focal point of the positive member and the first focal point of the negative member frequently referred to may properly be taken for the purposes of the claims of this specification as a certain two image points associated with the two members, in the case of the positive member the image point formed by the member acting on a hypothetical pencil of light converging upon the axial point of the object, and in the case of the negative member the virtual image point formed by the member of the axial point of the object. When the members are spaced so that these two image points coincide the objective has a null convergence effect with respect to pencils of light originating in said axial object point.

The cambrure of a simple lens is numerically equal to the strength of its first surface in diopters minus the strength of its second surface in diopters, both being given their appropriate signs. Throughout this specification, in defining and calculating cambrures, the first surface of the above definition will always be the surface of the member which is on the exterior of the objective. When the member is composed of several elements the cambrure will be calculated as a function of its first and last surface only. When the equations are applied to the negative member so as to evaluate the curvature of its tangential image surface the equations are applied as if parallel light were incident on the exterior surface of the negative member and the position of the image of its natural diaphragm, at the point 6 of Fig. 1, results from the structure of the objective as a whole and is located in the manner described below.

In Fig. 1, I have shown schematically the construction of such an objective consisting of the positive lens 1, and the negative lens 2. The two lenses or members are separated by such a distance that a para-axial pencil of parallel rays incident on the lens 1 leaves the lens 2 as a para-axial pencil of parallel light rays. At 3 I have drawn a pencil of parallel rays entering the first surface of the positive lens at its center at an angle of inclination to the axis of the system having a slope of approximately ten degrees. At the negative lens 2 the pencil is deflected away from the axis, to the position 4 to have an increased slope with the axis, a slope of approximately fifteen degrees. The ratio of the tangent of the first angle to the tangent of the second angle represents the numerical value of the compression or the magnification constant of the objective. Such a pencil 4 will, in general, not have its focal point in the same plane as the object, that is, in this case the pencil 4 will no longer be homocentric. There will be a certain amount of astigmatism along the ray 4, the ray 3 being homocentric. The problem is, however, different from that of a system of spherical surfaces in that the sagittal imagery is unaffected by the objective, the generatrices of its surfaces being all parallel to the sagittal planes. The sagittal object and image coincide per se. In order to correct the astigmatism it is therefore necessary to make the tangential image surface coincide with the object plane.

By a further development of the astigmatism equations of S. Czapski and then a simplification of them for a thin lens of two surfaces, it is possible to derive the following simple expression for the curvature of the image surface on which the tangential image of such a lens is formed, the object being assumed, for further simplification, to be at infinity, namely, $$\frac{1}{R_t} = -\frac{3n+1}{nF} + 6x\left[\frac{(n+1)}{nrF} - \frac{n}{(n-1)F^2}\right] - 3x^2\left[\frac{n+2}{r^2 nF} - \frac{2n+1}{r(n-1)F^2} + \frac{n^2}{(n-1)^2 F^3}\right]$$

Where $R_t$ is the radius of curvature of the tangential image surface, F the focal length of the lens, $r$ the radius of curvature of the surface upon which the parallel light is incident, $n$ the index of refraction of the glass and $x$ the distance from the surface of radius $r$, to the point at which the incident pencil, or the prolongation of the pencil cuts the axis. All distances are considered as positive in the direction of propagation of the incident parallel light. The above equation will hereinafter be called the Newcomer-Czapski equation.

This equation is immediately applicable to the problem of the afocal cylindrical objective and we may apply it in the simplest manner by requiring each member of the objective to be formed as an achromatized cemented doublet in which the two glasses composing the member have the same index of refraction. This expression for the curvature of the tangential image surface of such a lens is a function of the index of refraction of the glass, the cambrure of the lens and the distance from the lens to the point on its axis at which the pencil cuts it. In the case of the cylindrical objective here described, the mounting of the positive lens acts as a natural diaphragm for the system and oblique pencils are centered upon the center of this positive member. In Fig. 1 the oblique pencil 3 is properly chosen as passing through the center of the lens 1. As a consequence the value of $x$ in the above equation is zero and the expression for the curvature of the tangential image surface of the positive lens of this objective is a rectangular hyperbola involving only the index of refraction. For indices in the range of practicability the hyperbola is nearly a straight line parallel to the axis of indices. Therefore the curvature of the tangential image surface 5 in Fig. 1 of the positive lens is independent of the cambrure of this lens and substantially independent of its index of refraction.

If, therefore, the negative lens 2 can be so chosen as to have the same tangential image surface, the objective as a whole will be free of astigmatism.

The pencil of parallel rays 4 in its prolongation cuts the axis of the lens 2 at the virtual point 6, the position of the point 6 being a function of the focal length of the lens 2 or of the magnification constant of the objective. The point 6 never being at the center of the lens 2 the expression for the curvature of its tangential surface is a function of the cambrure of the lens and of its index of refraction, varying appreciably with changes in either parameter. It is in fact a quadratic expression in the cambrure and a cubic expression in the index of refraction.

Within a certain range of magnifications and for constructions of the objective so far discussed, for any index of refraction there are two cambrures for which the two tangential focal surfaces of the positive and negative lens are identical. One of these is a negative lens with its exterior surface very convex exteriorly and having therefore a large spherical aberration as a consequence of which only a poor correction for spherical aberration and coma is obtainable. For the other cambrure the lens is more or less concave exteriorly and the coma of the lens is small. Such a solution is preferable.

It is then necessary to correct the objective for spherical aberration. This will be accomplished for any marginal zone if the corresponding absolute numerical longitudinal aberrations of the positive and negative lenses are identical. As a first approximation for equal heights of incidence and equal focal lengths of the two lenses, their spherical aberrations must be in inverse proportion to their actual focal lengths as used. If we choose for the positive lens a form and an index such as to give the minimum or nearly minimum value to its spherical aberration then in general it will be found that our random choice of an astigmatic correction through a choice of the negative lens will result in a negative lens whose spherical aberration is less than the minimum possible for the positive lens. In order to turn this difficulty we may examine what further latitude we have for the choice of a negative lens.

In Fig. 2, I have shown a plot for an objective having a magnifying constant one half, the abscissæ being indices of refraction and the ordinates the values of the curvature of the tangential image surface of a single lens. At 9 I plot the value of the curvature of the tangential image surface for the positive lens between the limits $n=1.5$ and $n=1.7$. At 10 I plot a family of curves representing the values of the curvature of the tangential image surface of the negative lens for values of $n$ between $n=1.5$ and $n=1.7$, each curve of the family corresponding to a particular cambrure of the lens, these values algebraically decreasing upwards. Intersections of the curve 9 with the family of curves 10 represent solutions of the anastigmatic condition. It will be seen that algebraically increasing the cambrure or increasing the index of refraction of the negative lens decreases the curvature of its focal surface. Algebraically increasing the cambrure or decreasing the index of refraction, at least within the limits of this problem, increases the spherical aberration of this lens. It is thus possible, where appropriate pairs of indices for achromatism are available, to increase the spherical aberration of the negative lens by increasing its cambrure and decreasing its index of refraction simultaneously without changing the curvature of the tangential image. In this manner a solution can be reached.

There is a limit to the range of magnification over which solutions of this character can be made where the individual members of the objective are composed of approximated lenses of substantially equal indices. For instance, for an objective compressing as much as one to three no such solution exists. There is no cambrure or index of refraction giving a tangential image surface with as small a curvature as that of the positive lens. Again at a compression of one to two it is difficult to obtain a solution utilizing glasses available in the manufacturer's catalogues. For this magnification a suitable solution for astigmatism which also makes the spherical aberration of the negative lens sufficiently small is only obtained by choosing a pair of indices at the lower end of the range of pairs of suitable indices. It is necessary to make use of a cambrure corresponding to a curve about half way between that of the curves indicated at 11 and 12 of the family of curves 10 of Fig. 2.

The correction for the astigmatism of the objective is thus analytical. I have determined for a considerable number of instances that for pencils having a slope of ten degrees with the axis of the lens the analytical solution deviates uniformly approximately ten per cent from the trigonometric solution. In the problem here considered the two solutions are subtracted, so to speak, one from the other, and the error thus becomes of the order of one per cent. It is easy then, by the usual process of trigonometrical calculation to interpolate an absolute correction.

The correction for spherical aberration is first made in the usual analytical fashion and then a correct solution interpolated by trigonometric methods. In the example which I give below the objective has been spherically corrected, as referred to para-axial refraction, for a zone eleven-tenths of the maximum opening of the positive lens. I choose this zone arbitrarily without wishing to limit myself to such a correction as necessarily the best one.

Ordinarily it is sufficient if objectives of this character for use in motion picture practice are corrected for pencils whose maximum slope with respect to the axis at the positive lens does not exceed ten degrees and indeed at least for projection this maximum slope may be almost halved. Such objectives, besides being corrected for astigmatism, should be not only corrected for spherical aberration of one color and para-axial achromatism but also for marginal spherical aberration of another color and in addition they should be freed from comas as far as practicable.

In the above analytical discussion the curvature of the tangential image surface was taken as conforming to the values of the analytical expression. In calculating through trigonometrically for the actual distance of the tangential image of the positive lens, this distance may be made to vary somewhat by changing the cambrures and indices of the two glasses because of the actual thicknesses which they possess.

If we separate the two component lenses of a member by an air space or if even without such separation in the case of the negative member we depart appreciably from equality of indices for the two component lenses of the member then the simple analytical formula given above is not sufficient to determine the curvature of the tangential image surface. The second lens of such a member then adds an increment of curvature positive or negative to the curvature of the tangential image surface of the member as a whole which is different from the increment in the case for the cemented doublet of equal indices. The curvature of the tangential image surface of such a member is determined by a double application of the formula. The value of the curvature of the surface for the first lens of the member is determined as above, the solution giving the distance of the tangential image point. As a first approximation this distance may be taken as equal to the focal length of the first lens. This distance $a$ then enters into the following formula—

$$\frac{1}{R_t} = -\frac{3n+1}{nF} + \frac{6}{\left(\frac{1}{x}-\frac{1}{a}\right)}\left[\frac{n+1}{rnF} - \frac{n}{(n-1)F^2} - \frac{2n+1}{anF}\right] - \frac{3}{\left(\frac{1}{x}-\frac{1}{a}\right)^2}\left[\frac{n+2}{r^2nF} - \frac{2n+1}{r(n-1)F^2} - \frac{4n+4}{arnF} + \frac{n^2}{(n-1)^2F^3} + \frac{3n+1}{a(n-1)F^2} + \frac{3n+2}{a^2nF}\right]$$

The evaluation of this formula gives the desired curvature of the tangential image surface of the member as a whole. If the member were composed of three lenses the formula would be applied again to the third lens, etc.

We have, thus, not only introduced the possibility of reducing the curvature of the tangential image surface 5 of Fig. 1 and hence the deviations from coincidence of the two surfaces throughout but we have also made it possible to make use of the great mass of information accumulated during the last century for the decrease of the spherical aberration, coma and secondary spectrum of the positive member to values below the limits possible in the discussion above for a simple cemented doublet of approximately equal indices. We may, for instance, even reduce the spherical aberration further than that balancing a simple negative member if we at the same time reduce the spherical aberration of the negative member by treating it in a similar fashion. The resultant interzonal corrections for spherical aberration and the correction for coma will thus be further improved. Thus while the increase in the number of variables permits greater improvements in the corrections, the analytical solution remains simple although the labor of carrying out the final trigonometric refinements is increased.

In this discussion I have considered the objective as composed of two members, a positive one and a negative one. It is an essential characteristic of the objective that this condition should be fulfilled if an afocal compression objective is to result. Let us examine what latitude this gives us for the construction of the individual members. Consider the fundamental equation of Gullstrand for the combination of two refracting systems.

$$D_{1,2} = D_1 + D_2 - \delta D_1 D_2$$
$$H_{1,2} = \frac{\delta D_2}{D_{1,2}} \quad H'_{1,2} = -\frac{\delta D_1}{D_{1,2}}$$

where $D_{1,2}$ is the refractive power of the combined system, $D_1$ and $D_2$ the refractive powers of the first and second system respectively, $\delta$ the distance from the second principal point of the first system to the first principal point of the second system divided by the index of refraction of the intervening medium, and $H_{1,2}$ and $H'_{1,2}$ are the distances of the first and second principal points of the combined system from the first and second principal points of the partial systems respectively. Considering the application of this equation to the construction of a combined system substituting either member of the afocal objective, it is obvious that if the combined system is to be negative, both partial elements cannot be positive as the last term is otherwise less in absolute value than the sum of the other two. For a negative combined system in which the partial elements are not both negative, the last term is positive and the combined refractive power cannot be given a greater value by separating them. The reverse is the case for a positive combined system. If a positive combined system is composed of a positive and a negative partial element, as it must be if it is to be achromatic, then increasing the distance between the two elements increases the refractive power of the combined system, and we may keep the combined system of the same refractive power while increasing the refractive power of the negative element. If in our afocal objective we displace the positive element of the positive member toward the inside of the objective and move it away from its component negative element, then the above formulæ show that the second principal point of the combined positive member lies at a substantial distance away from the positive element and in the direction of the negative member of the afocal objective. The first principal point of the combined positive member is displaced a substantial amount in the same direction. By an appropriate choice of refractive powers of the three lenses and constringences of the glasses composing them the afocal combination of three simple lenses can be made achromatic. It is necessary to determine the position of the natural diaphragm in order to apply the usual equations. In Fig. 1 the ray 4, if followed backward along its path, passes through the center of the lens 1. For a lens of finite thickness it would be more appropriate to say that the ray 3, if constructed to be parallel to itself on each side of the lens 1 must enter and leave the lens so as to be directed through and from respectively the first and second principal points of the lens 1. These same conditions hold for the positive combination of the three lens objective.

In Fig. 3 I have shown schematically the construction of such an afocal objective with a magnification constant two-thirds. At 14 I have indicated a negative lens, at 15 a positive lens separated from the lens 14 by a substantial interval. At 16 and 17 I have indicated respectively the first and second principal points of the combined system 14, 15 and at 18 I show the negative member of the afocal objective. At 17 I have also indicated the diaphragm of the system. A ray parallel to the axis entering the lens 14 at any given height leaves the lens 18 parallel to the axis and at two-thirds of the same height. At 19 I have indicated an oblique ray entering the lens 14 and directed toward the point 16 with an arbitrary slope of ten degrees. At 14 it is deflected away from the axis and at 15 it is deflected to pass through the point 17 and parallel to the original direction of incidence at 19. At the lens 18 it is again deflected away from the axis to leave the lens as the ray 20 having a slope of approximately fifteen degrees with the axis. The second principal plane of the combined positive member occupies the position of the natural diaphragm of the objective as a whole and a physical diaphragm should be placed in this position.

To illustrate this discussion, I give below the data for one of the infinity of such achromatic afocal compression objectives having a magnification constant of two-thirds. The three refractive powers and constringence ratios of its three lenses and its construction points are as follows:

| Lens I | Lens II | Lens III |
|---|---|---|
| $D_1 = -10$ diopters $v_1 = v_1$ | $D_2 = +12$ diopters $v_2 = \frac{325}{174} v_1$ | $D_3 = -10$ diopters $v_3 = \frac{13}{7} v_1$ |

For the group I, II $D_{1,2} = 6\tfrac{2}{3}$ diopters
$H_{1,2} = 70$ millimeters
$H'_{1,2} = 58\tfrac{1}{3}$ millimeters It is to be understood that this data is for a single objective as described above and schematically indicated in Figure 3. As such it completely defines all of the dimensions and spacings there indicated.

Such an objective is corrected as is the two lens objective by a choice of a pair of equal curvatures of the tangential image surfaces corresponding to balanced spherical aberrations. The curvatures of the tangential image surfaces of the various possible forms of the negative lens are determined as described above. In the case of the combined positive member we determine a family of curves similar to the curves 10 of Fig. 2 giving the curvatures of the tangential image surfaces corresponding to possible forms and indices of the second or positive lens of the positive member, the $x$ of the formula being fixed in value by the geometrical construction of Fig. 3 and an approximate value of the quantity $a$ of the formula being derived from the value for the focal length of the first or negative lens of the member. It is then a simple problem to consider the variations in these curves due to the possible variations in the parameter $a$ obtainable by changes in the character of the lens 14. From this final double family of curves representing possible curvatures of the tangential image surface of the positive member we may choose a value for the curvature equal to one of the possible curvatures of the tangential image surface of the third lens or negative member. The number of possible solutions is limited by the limitation placed upon the indices of the glasses by the constringencies which are required for them. Considerations relative to the balancing of the spherical aberrations of the lenses further limit the possible solutions. The analytical solution is finally corrected by trigonometric calculations.

In Fig. 4 are illustrated lenses for an objective magnifying two to three. At 21 I have shown a positive cylindrical achromatized cemented doublet and at 22 a negative cylindrical achromatized cemented doublet with characteristics as follows:

$r_1 = +55.3$ mm. $d_1 = 4.5$ mm. $n_1 = 1.5688$ $\nu_1 = 56.0$ $\alpha_1 = 748$ $r_2 = -21.3$ mm. $d_2 = 1.5$ mm. $n_2 = 1.575$ $\nu_2 = 41.3$ $\alpha_2 = 766$ $r_3 = $ infinity
Interval 26.944 mm.

$r_4 = -92$ mm. $d_3 = 4.5$ mm. $n_3 = 1.575$ $\nu_3 = 41.3$ $\alpha_3 = 766$ $r_5 = -15$ mm. $d_4 = 1.5$ mm. $n_4 = 1.5638$ $\nu_4 = 60.7$ $\alpha_4 = 707$ $r_6 = +61$ mm.

Free opening of each doublet 20 mm.

The component elements of this objective were selected so as to have elements the coefficients of expansion, $\alpha$ of which would be as nearly equal as possible. This is a great advantage in cemented objectives subjected to heat.

In giving this solution I do not, however, thereby limit myself either to this magnification or to forming the objective of pairs of glasses of nearly equal indices, or to cementing the pairs of glasses together. Indeed as described above, I may, under appropriate circumstances, form one or both members of different glasses cemented or uncemented, two or more glasses to a member according as I desire to push further the corrections of the residual aberrations or improve the form of the positive or negative member. The correction discussed above by which the objective is achromatized as a whole, the positive member consisting of two simple lenses separated by a substantial interval and the negative member of a simple negative lens offers many advantages and is subject to entirely similar balancing of the aberrations and tangential focal surface of the one member against the other. If one of the lenses of this triplet be a cemented doublet, the corrections can be further refined. The central position of the diaphragm increases as has been shown the number of astigmatic solutions available and at the same time makes it possible to decrease the distortion to a greater extent than in the objective composed of two simple members only.

The foregoing particular description is illustrative merely and is not intended as defining the limits of the invention. Certain subject matter disclosed in this application is claimed in applicant's co-pending application Ser. No. 424,599 filed January 30, 1930.

I claim:

An optical apparatus for taking or projecting cinematographic or photographic views comprising in combination an anamorphoser and a spherical objective, the anamorphoser being composed of a convergent and a divergent cylindrical lens with parallel generating lines and coincident axial planes, the convergent and divergent lenses being spaced a distance apart substantially equal to the difference between their absolute focal lengths, whereby the second focal point of the convergent lens coincides with the first focal point of the divergent lens, thus locating the image due to the anamorphoser in the same plane as the object, and thus correcting for astigmatism along the axis of the anamorphoser, the cylindrical lens of the anamorphoser situated furthest from the spherical objective being divergent and having a concave exterior surface, thus correcting for astigmatism of oblique rays, in which the anamorphoser comprises one plane-convex and one double concave cylindrical lens, the index of refraction of the different glasses being substantially the same, of the order of 8/5.

HARRY SIDNEY NEWCOMER.